United States Patent
Feng (10) Patent No.: US 10,826,610 B2
(45) Date of Patent: *Nov. 3, 2020

(54) WIRELESS COMMUNICATIONS SYSTEM AND WIRELESS RADIO FREQUENCY APPARATUS

(71) Applicant: Huawei Technologies Co., Ltd., Shenzhen (CN)

(72) Inventor: Liexun Feng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,739

(22) Filed: Mar. 19, 2019

(65) Prior Publication Data

US 2019/0215068 A1   Jul. 11, 2019

Related U.S. Application Data

(63) Continuation of application No. 15/338,557, filed on Oct. 31, 2016, now Pat. No. 10,270,530, which is a
(Continued)

(51) Int. Cl.
*H04J 14/00* (2006.01)
*H04B 10/2575* (2013.01)
(Continued)

(52) U.S. Cl.
CPC ....... *H04B 10/2575* (2013.01); *G02B 6/2938* (2013.01); *H04B 10/11* (2013.01);
(Continued)

(58) Field of Classification Search
CPC .......... H04B 10/2575; H04B 10/25752; H04B 10/25753; H04B 10/25754; H04B 10/40;
(Continued)

(56) References Cited

U.S. PATENT DOCUMENTS

| 7,609,971 B1* | 10/2009 | Zhou ............... H01Q 25/00 342/375 |
| 10,270,530 B2* | 4/2019 | Feng .............. H04B 10/2575 |

(Continued)

FOREIGN PATENT DOCUMENTS

| CN | 101166041 A | 4/2008 |
| CN | 101232345 A | 7/2008 |

(Continued)

OTHER PUBLICATIONS

Machine Translation and Abstract of Japanese Publication No. JP2004363948, Dec. 24, 2004, 22 pages.
(Continued)

*Primary Examiner* — Hanh Phan
(74) *Attorney, Agent, or Firm* — Conley Rose, P.C.

(57) ABSTRACT

A wireless communications system includes a baseband processing unit (BBU), an optical multiplexer, M (greater than or equal to 2) first optical transceivers, and a wireless radio frequency apparatus, where the M first optical transceivers are provided between the BBU and the optical multiplexer, and operating wavelengths of the M first optical transceivers are different from each other. The wireless radio frequency apparatus includes M remote radio units (RRUs), M second optical transceivers separately corresponding to the M first optical transceivers, and at least one optical splitter, where the M second optical transceivers are separately connected to the M RRUs, and an operating wavelength of a first optical transceiver matches an operating wavelength of a corresponding second optical transceiver. The M second optical transceivers are connected to a same optical fiber by the optical splitter, and the optical fiber is connected to the optical multiplexer and the optical splitter.

20 Claims, 4 Drawing Sheets

Related U.S. Application Data continuation of application No. PCT/CN2014/076503, filed on Apr. 29, 2014.

(51) Int. Cl.
  *H04J 14/02* (2006.01)
  *G02B 6/293* (2006.01)
  *H04B 10/11* (2013.01)
  *H04B 10/40* (2013.01)

(52) U.S. Cl.
  CPC .............. *H04B 10/40* (2013.01); *H04J 14/02* (2013.01); *H04J 14/0201* (2013.01)

(58) Field of Classification Search
  CPC ...... H04J 14/02; H04J 14/023; H04J 14/0234; H04J 14/0236; H04W 88/08; H04W 88/085
  USPC ... 398/115, 116, 117, 66, 67, 68, 72, 79, 82, 398/69, 70, 71, 135, 76, 136, 138; 455/561, 562, 422, 3.1, 5.1; 370/352, 370/392, 389, 468, 328, 329
  See application file for complete search history.

(56) References Cited

U.S. PATENT DOCUMENTS

| | | | |
|---|---|---|---|
| 2003/0161637 A1 | 8/2003 | Yamamoto et al. | |
| 2007/0206950 A1 | 9/2007 | Liu et al. | |
| 2010/0150566 A1* | 6/2010 | Soto | H04B 10/272 398/115 |
| 2010/0226649 A1 | 9/2010 | Cheng et al. | |
| 2013/0004174 A1* | 1/2013 | Lee | H04J 14/0246 398/79 |
| 2013/0089336 A1* | 4/2013 | Dahlfort | H04B 10/25759 398/115 |
| 2013/0236180 A1* | 9/2013 | Kim | H04J 14/0236 398/72 |
| 2014/0301734 A1* | 10/2014 | Fang | H04J 14/005 398/76 |
| 2015/0229397 A1 | 8/2015 | Shibata et al. | |
| 2015/0349912 A1 | 12/2015 | Komi et al. | |
| 2015/0372763 A1* | 12/2015 | Wang | H04B 10/58 398/81 |

FOREIGN PATENT DOCUMENTS

| | | | |
|---|---|---|---|
| CN | 101350662 A | 1/2009 | |
| CN | 101841748 A | 9/2010 | |
| CN | 102065343 A | 5/2011 | |
| CN | 22374404 U | 8/2012 | |
| CN | 102710361 A | 10/2012 | |
| CN | 102984604 A | 3/2013 | |
| EP | 2753141 A1 | 7/2014 | |
| JP | H11340953 A | 12/1999 | |
| JP | 2003324393 A | 11/2003 | |
| JP | 2004363948 A | 12/2004 | |
| JP | 2005094263 A | 4/2005 | |
| JP | 2006319857 A | 11/2006 | |
| JP | 2010245987 A | 10/2010 | |
| JP | 4852260 B2 | 1/2012 | |
| WO | 2013029385 A1 | 3/2013 | |
| WO | 2014061552 A1 | 4/2014 | |

OTHER PUBLICATIONS

Machine Translation and Abstract of Japanese Publication No. JP2005094263, Apr. 7, 2005, 30 pages.
Foreign Communication From a Counterpart Application, Japanese Application No. 2016-565453, Japanese Notice of Allowance dated Apr. 1, 2019, 3 pages.
Machine Translation and Abstract of Chinese Publication No. CN102065343, May 18, 2011, 10 pages.
Machine Translation and Abstract of Chinese Publication No. CN202374404, Aug. 8, 2012, 8 pages.
Machine Translation and Abstract of Chinese Publication No. CN101232345, Jul. 30, 2008, 8 pages.
Machine Translation and Abstract of Japanese Publication No. JP2010245987, Oct. 28, 2010, 21 pages.
Machine Translation and Abstract of Japanese Publication No. JPH11340953, Dec. 10, 1999, 13 pages.
Machine Translation and Abstract of Chinese Publication No. CN101350662, Jan. 21, 2009, 16 pages.
Machine Translation and Abstract of Japanese Publication No. JP4852260, Jan. 11, 2012, 20 pages.
Liu, C., et al., "A Novel Multi-Service Small-Cell Cloud Radio Access Network for Mobile Backhaul and COmputing Based on Radio-Over-FIber Technologies," Journal of Lightwave Technology, vol. 31, No. 17, Sep. 1, 2013, pp. 2869-2875.
Koonen, T., et al., "Novel cost-efficient techniques for microwave signal delivery in fibre-wireless networks," Proceedings of the 30th European Conference on Optical Communication, Sep. 5-9, 2004, 5 pages.
Foreign Communication From a Counterpart Application, European Application No. 14890981.5, Extended European Search Report dated Apr. 3, 2017, 11 pages.
Foreign Communication From a Counterpart Application, PCT Application No. PCT/CN2014/076503, English Translation of International Search Report dated Jan. 14, 2015, 3 pages.
Foreign Communication From a Counterpart Application, PCT Application No. PCT/CN2014/076503, English Translation of Written Opinion dated Jan. 14, 2015, 17 pages.
Foreign Communication From a Counterpart Application, Chinese Application No. 201480000671.6, Chinese Office Action dated Dec. 20, 2017, 8 pages.
Foreign Communication From a Counterpart Application, Japanese Application No. 2016-565453, Japanese Office Action dated Feb. 6, 2018, 6 pages.
Foreign Communication From a Counterpart Application, Japanese Application No. 2016-565453, English Translation of Japanese Office Action dated Feb. 6, 2018, 7 pages.
Foreign Communication From a Counterpart Application, Chinese Application No. 201480000671.6, Chinese Office Action dated Jun. 13, 2018, 5 pages.
Foreign Communication From a Counterpart Application, Korean Application No. 10-2016-7032719, Korean Office Action dated Jan. 11, 2019, 5 pages.
Foreign Communication From a Counterpart Application, Korean Application No. 10-2016-7032719, English Translation of Korean Office Action dated Jan. 11, 2019, 4 pages.

* cited by examiner

WIRELESS COMMUNICATIONS SYSTEM AND WIRELESS RADIO FREQUENCY APPARATUS

CROSS-REFERENCE TO RELATED APPLICATIONS

This application is a continuation of U.S. patent application Ser. No. 15/338,557, filed on Oct. 31, 2016, which is a continuation of international patent application number PCT/CN2014/076503, filed on Apr. 29, 2014. All of the afore-mentioned patent applications are hereby incorporated by reference in their entireties.

TECHNICAL FIELD

The present application relates to the field of communications technologies, and in particular, to a wireless communications system and a wireless radio frequency apparatus.

BACKGROUND

Many radio networks use a distributed base station architecture, where a remote radio unit (RRU) is connected to a baseband processing unit (BBU) by an optical fiber, and one BBU can support multiple RRUs. In a scenario in which multiple RRUs need to be connected to a same BBU at a same station, cascading of the multiple RRUs is a common networking manner.

Figure 5:
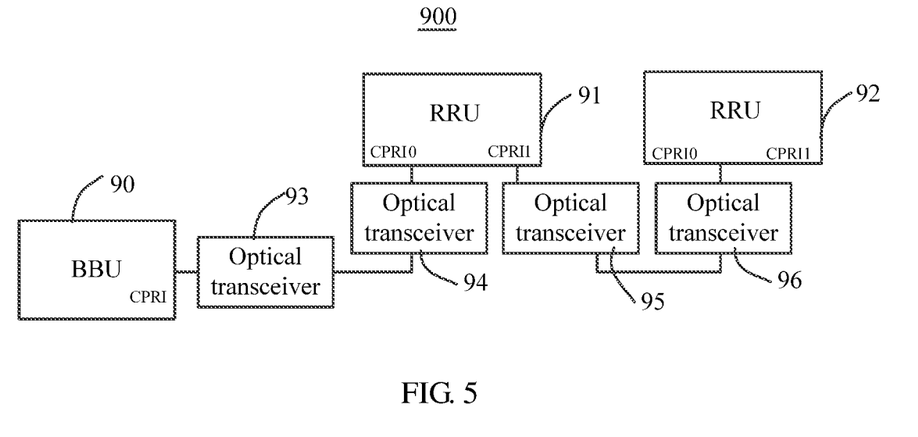
FIG. 5 is a schematic structural diagram of a wireless communications system.

In the following, a data transmission mode of a wireless communications system 900 in which one BBU supports two cascaded RRUs is used as an example for description. As shown in FIG. 5, in a downlink direction, a BBU 90 receives downlink data sent by a gateway, processes the downlink data, and sends processed downlink data to an optical transceiver 93 through a common public radio interface (CPRI), where the optical transceiver is also referred to as an optical module. The optical transceiver 93 converts the processed downlink data into a first downlink optical carrier signal, and sends, through an optical fiber, the first downlink optical carrier signal to an optical transceiver 94 that corresponds to an RRU 91. The optical transceiver 94 converts the first downlink optical carrier signal into a first downlink electrical signal, and sends the first downlink electrical signal to the RRU 91. The RRU 91 selectively receives part of the first downlink electrical signal, sends the remaining signal to an optical transceiver 95. The optical transceiver 95 converts the remaining signal into a second downlink optical carrier signal, and sends the second downlink optical carrier signal to an optical transceiver 96 through an optical fiber. The optical transceiver 96 converts the second downlink optical carrier signal into a second downlink electrical signal, and sends the second downlink electrical signal to an RRU 92. In this way, the downlink data received from the gateway can be sent to a mobile terminal using the RRU 91 and the RRU 92.

In an uplink direction, the RRU 91 and the RRU 92 separately receive uplink data sent by the mobile terminal, and process the uplink data to obtain an uplink electrical signal. The RRU 92 sends an obtained first uplink electrical signal to the optical transceiver 96 that corresponds to the RRU 92. The optical transceiver 96 converts the first uplink electrical signal into a first uplink optical carrier signal, and sends, through an optical fiber, the first uplink optical carrier signal to the optical transceiver 95 that corresponds to the RRU 91. The optical transceiver 95 converts the first uplink optical carrier signal into a second uplink electrical signal, and sends the second uplink electrical signal to the RRU 91. The RRU 91 integrates the second uplink electrical signal with the uplink electrical signal obtained by the RRU 91 to obtain a third uplink electrical signal, and sends the third uplink electrical signal to the optical transceiver 94 connected to the RRU 91. The optical transceiver 94 converts the third uplink electrical signal into a second uplink optical carrier signal, and sends the second uplink optical carrier signal to the BBU 90 through an optical fiber such that the BBU 90 processes the second uplink optical carrier signal and sends a processed second uplink optical carrier signal to the gateway.

It can be seen that the RRU 91 needs to forward data sent to or from the RRU 92, and when the RRU 91 is faulty, the RRU 92 cannot work.

Therefore, the existing networking structure of a distributed base station has the following disadvantages where when an RRU (referred to as a current RRU) of cascaded RRUs is faulty, a next RRU cannot work, which reduces system reliability.

SUMMARY

In view of this, embodiments of the present application provide a wireless communications system and a wireless radio frequency apparatus, which resolve a technical problem of low system reliability caused by that when an RRU of multiple cascaded RRU is faulty in an existing distributed base station architecture, a next RRU cannot work.

A first aspect provides a wireless radio frequency apparatus, where the wireless radio frequency apparatus includes M RRUs, M optical transceivers, and at least one optical splitter, where M is an integer greater than or equal to 2. The M optical transceivers are separately connected to the M RRUs, and operating wavelengths of the M optical transceivers are different from each other, and the M optical transceivers are connected to a same optical fiber by the at least one optical splitter.

In a first possible implementation manner of the first aspect, the optical splitter is a 1:N optical splitter, and N is an integer greater than or equal to 2 and less than or equal to M.

With reference to the first possible implementation manner of the first aspect, in a second possible implementation manner of the first aspect, the optical splitter is a 1:2 optical splitter, and a quantity of optical splitters is M−1.

With reference to the second possible implementation manner of the first aspect, in a third possible implementation manner of the first aspect, when M is greater than 2, the M−1 optical splitters are connected to each other by a single-core optical fiber.

With reference to the first aspect or any one of the first to third possible implementation manners of the first aspect, in a fourth possible implementation manner of the first aspect, the optical fiber is a single-core optical fiber.

With reference to the first aspect or any one of the first to fourth possible implementation manners of the first aspect, in a fifth possible implementation manner of the first aspect, an operating wavelength of each optical transceiver of the first optical transceivers and the second optical transceivers includes a receive wavelength and a transmit wavelength.

A second aspect of this application provides a wireless communications system, where the wireless communications system includes a BBU, an optical multiplexer, M first optical transceivers, and a wireless radio frequency apparatus, where the M first optical transceivers are provided between the BBU and the optical multiplexer, operating wavelengths of the M first optical transceivers are different from each other, and M is an integer greater than or equal to 2. The wireless radio frequency apparatus includes M RRUs, M second optical transceivers, and at least one optical splitter, where the M second optical transceivers are separately connected to the M RRUs, and are separately corresponding to the M first optical transceivers, and an operating wavelength of a first optical transceiver matches an operating wavelength of a second optical transceiver corresponding to the first optical transceiver. The M second optical transceivers are connected to a same optical fiber by the at least one optical splitter, and the optical fiber is connected to the optical multiplexer and one of the at least one optical splitter.

In a first possible implementation manner of the second aspect, the optical splitter is a 1:N optical splitter, and N is an integer greater than or equal to 2 and less than or equal to M.

With reference to the first possible implementation manner of the second aspect, in a second possible implementation manner of the second aspect, the optical splitter is a 1:2 optical splitter, and a quantity of optical splitters is M−1.

With reference to the second possible implementation manner of the second aspect, in a third possible implementation manner of the second aspect, the M−1 optical splitters are connected to each other by a single-core optical fiber when M is greater than 2.

With reference to the second aspect or the first, the second, or the third possible implementation manner of the second aspect, in a fourth possible implementation manner of the second aspect, the optical fiber is a single-core optical fiber.

With reference to the second aspect or any one of the first to fourth possible implementation manners of the second aspect, in a fifth possible implementation manner of the second aspect, an operating wavelength of each optical transceiver of the first optical transceivers and the second optical transceivers includes a receive wavelength and a transmit wavelength.

With reference to the fifth possible implementation manner of the second aspect, in a sixth possible implementation manner of the second aspect, that an operating wavelength of a first optical transceiver matches an operating wavelength of a second optical transceiver corresponding to the first optical transceiver includes that in the first optical transceiver and the second optical transceiver corresponding to the first optical transceiver, the transmit wavelength of the first optical transceiver is the same as the receive wavelength of the second optical transceiver, and the receive wavelength of the first optical transceiver is the same as the transmit wavelength of the second optical transceiver.

In the wireless communications system of this application, optical signals of different RRUs are transmitted using different wavelengths (which includes transmission from an RRU to a BBU, and transmission from a BBU to an RRU), and correspondingly, optical transceivers of the cascaded RRUs work at different wavelengths. Further, an optical splitter is further provided, and the optical transceivers of these cascaded RRUs are all connected to the optical splitter, and are connected to a same optical fiber by the optical splitter. In this way, optical signals of multiple RRUs that are transmitted on the optical fiber can be transmitted to the optical transceivers of all the RRUs using the optical splitter, and each optical transceiver receives only a signal corresponding to its own operating wavelength. Therefore, each RRU can correctly receive its own signal, and when an RRU is faulty, operation of the other RRUs is not affected, which greatly increases system reliability, and resolves the technical problem of low system reliability caused by that when a RRU of multiple cascaded RRUs is faulty in an existing distributed base station architecture, all next RRUs cannot work.

In addition, after the foregoing solution is used, each RRU receives its own signal without the need to forward a signal of another RRU, which reduces a requirement on bandwidth of a CPRI and reduces costs, and does not cause any limitation to a quantity of levels of cascaded RRUs. Further, each RRU no longer needs to be provided with two CPRIs, thereby further reducing the costs. In addition, a decrease in the requirement on the bandwidth of the CPRI further reduces a requirement on a rate of an optical transceiver, which further reduces the costs.

BRIEF DESCRIPTION OF DRAWINGS

To describe the technical solutions in the embodiments of the present application more clearly, the following briefly introduces the accompanying drawings required for describing the embodiments. The accompanying drawings in the following description show merely some embodiments of the present application.

DESCRIPTION OF EMBODIMENTS

At present, in a distributed base station architecture, cascading of multiple RRUs is a common networking manner. However, for this networking manner, a current RRU sends data to a next RRU in a forwarding manner, and all next RRUs cannot work when the current RRU is faulty, which results in reduced system reliability.

In this application, based on a full consideration of this problem, optical signals of different RRUs are transmitted using different wavelengths (which includes transmission from an RRU to a BBU, and transmission from a BBU to an RRU), and correspondingly, optical transceivers of the cascaded RRUs work at different wavelengths. Further, an optical splitter is further provided, and the optical transceivers of these cascaded RRUs are all connected to the optical splitter, and are connected to a same optical fiber by the optical splitter. In this way, optical signals of multiple RRUs that are transmitted on the optical fiber can be transmitted to the optical transceivers of all the RRUs using the optical splitter, and each optical transceiver receives only a signal corresponding to its own operating wavelength. Therefore, each RRU can correctly receive its own signal, and working of the other RRUs is not affected when an RRU is faulty, which greatly increases system reliability.

In addition, in some other works, data of all RRUs needs to pass through a CPRI of the first RRU, and therefore, there is a relatively high requirement on bandwidth of the CPRI, which increases costs. In a case in which the bandwidth of the CPRI is limited, a quantity of levels of cascaded RRUs is limited. In addition, an increase in the bandwidth of the CPRI increases a requirement on a rate of an optical transceiver, which further increases the costs.

However, after the foregoing solution is used, each RRU receives its own signal without the need to forward a signal of another RRU, which reduces the requirement on the bandwidth of the CPRI and reduces the costs, and does not cause any limitation to the quantity of levels of cascaded RRUs. Further, each RRU no longer needs to be provided with two CPRI, thereby further reducing the costs. In addition, a decrease in the requirement on the bandwidth of the CPRI further reduces the requirement on the rate of the optical transceiver, which further reduces the costs.

It can be seen that the technical solution of this application not only resolves the problem of low reliability in other approaches, but also greatly reduces costs, and does not cause any limitation to a quantity of levels of cascaded RRUs.

To make persons skilled in the art better understand the solution of the present application, the following clearly describes the technical solution in the embodiments of the present application with reference to the accompanying drawings in the embodiments of the present application. The described embodiments are merely some rather than all of the embodiments of the present application.

Embodiment 1

Figure 1:
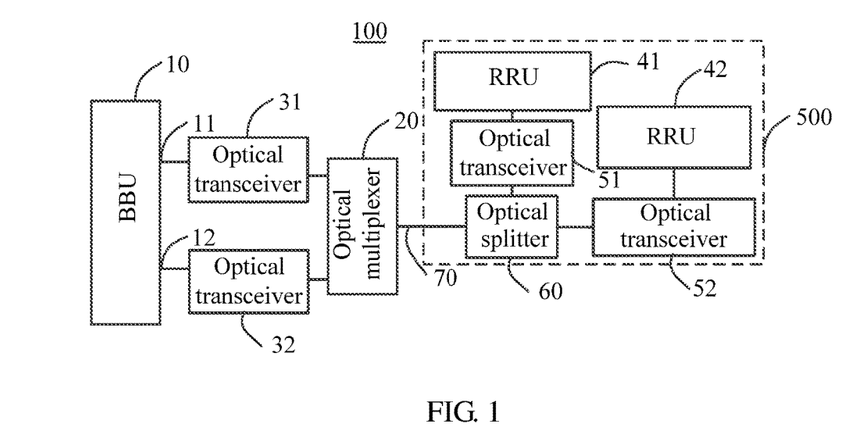
FIG. 1 is a schematic structural diagram of a wireless communications system according to an embodiment of the present application.

FIG. 1 is a schematic structural diagram of a wireless communications system 100 according to an embodiment of the present application. As shown in FIG. 1, the wireless communications system 100 includes a BBU 10, an optical multiplexer 20, optical transceivers 31 and 32, and a wireless radio frequency apparatus 500, where the wireless radio frequency apparatus 500 includes RRUs 41 and 42, optical transceivers 51 and 52, and an optical splitter 60.

The BBU 10 may include a transmission subsystem, a baseband subsystem, a control subsystem, and a power supply module. The transmission subsystem is configured to implement a function of transmitting and receiving data, and includes an interface between the BBU 10 and a core network/controller and an interface between the BBU 10 and a radio frequency module, where the interface between the BBU 10 and the radio frequency module may be a CPRI or an Open Base Station Architecture Initiative (OBSAI) interface. In this implementation manner, the BBU 10 includes two interfaces, that is, a quantity of interfaces is the same as a quantity of RRUs 41 and 42. The power supply module is configured to provide required power supply for the BBU 10.

The baseband subsystem is mainly configured to implement a baseband processing function for uplink and downlink data, and mainly includes an uplink processing module and a downlink processing module. The uplink processing module is configured to demodulate and decode uplink baseband data from the transmission subsystem, and transmit decoded and demodulated data through the transmission subsystem. The downlink processing module is configured to modulate and encode downlink baseband data from the transmission subsystem, and transmit modulated and encoded data through the transmission subsystem.

The control subsystem is configured to manage the entire wireless communications system 100, and the control subsystem may have, for example, one or more of the functions, operation and maintenance functions such as device management, configuration management, alarm management, software management, and debugging and testing management, a signaling processing function such as logical resource management, clock module functions such as phase locking a global positioning system (GPS) clock, performing frequency dividing, phase locking and phase adjustment, and providing a clock, which meets a requirement, for an entire base station.

The RRUs 41 and 42 are configured to send, to an antenna feeder and by means of transmission filtering, a downlink baseband signal that is received from the BBU 10 and has undergone frequency conversion, filtering, radio frequency filtering, and passed a linear power amplifier, or perform filtering, low noise amplification, further radio frequency small signal amplification and filtering, down-conversion, analog-to-digital conversion, digital intermediate frequency processing, and the like on an uplink signal received from a mobile terminal. Each RRU 41 and 42 is communicatively connected to the BBU 10 using one interface.

The optical multiplexer 20 is referred to as an optical MUX for short, with a full name being optical multiplexer. The optical multiplexer 20 is a device that combines and separates several optical carrier signals having different wavelengths, and may combine several optical carrier signals having different wavelengths onto one optical fiber for transmission, or separate optical carrier signals into multiple optical carrier signals according to the wavelengths to transmit the multiple optical carrier signals through multiple optical fibers. The optical multiplexer 20 generally includes multiple input interfaces and one output interface. In this implementation manner, the optical multiplexer 20 includes two input interfaces and one output interface, where both the input interfaces and the output interface are single-core bidirectional interfaces. In another implementation manner, the interfaces may be dual-core bidirectional interfaces.

The optical transceiver, such as the optical transceivers 31, 32, 51, and 52 is also referred to as an optical module, and is configured to implement optical/electrical conversion, where the optical/electrical conversion mentioned herein includes conversion from an optical signal to an electrical signal, and also includes conversion from an electrical signal to an optical signal. The optical transceivers 31 and 32 are provided between the BBU 10 and the optical multiplexer 20, where the optical transceiver 31 is connected to one input interface of the optical multiplexer 20 and one CPRI of the BBU 10, and the optical transceiver 32 is connected to another input interface of the optical multiplexer 20 and another CPRI of the BBU 10. The optical transceivers 51 and 52 are connected to the RRUs 41 and 42, respectively, that is, the optical transceiver 51 is connected to the RRU 41, and the optical transceiver 52 is connected to the RRU 42.

An optical transceiver generally includes an optoelectronic device, a functional circuit, an optical interface, and the like, where the optoelectronic device includes an emitting part and a receiving part. The emitting part is implemented as follows. After an electrical signal with a particular bit rate is input and processed by an internal driver chip, a semiconductor laser device (LD) or a light-emitting diode (LED) is driven to emit a modulated optical signal having a corresponding rate, where an automatic optical power control circuit is provided inside the optoelectronic device in order to keep power of the output optical signal steady. The receiving part is implemented as follows. After an optical signal with a particular bit rate is input into the module, the optical signal is converted into an electrical signal by a photodetection diode, and a head amplifier amplifies the electrical signal and outputs an electrical signal with a corresponding bit rate. In short, a function of the optical transceiver is optical/electrical conversion.

Each optical transceiver connected to the BBU 10 is corresponding to one RRU, and at each RRU, one optical transceiver corresponding to the RRU is provided. Operating wavelengths of optical transceivers corresponding to a same RRU match each other, and operating wavelengths of optical transceivers corresponding to different RRUs are different, for example, operating wavelengths of the optical transceivers 31 and 51 corresponding to the RRU 41 match each other, and operating wavelengths of the optical transceivers 32 and 52 corresponding to the RRU 42 match each other, but the operating wavelengths of the optical transceivers 31 and 32 are different, and the operating wavelengths of the optical transceivers 51 and 52 are different, thereby ensuring that the optical transceiver corresponding to each RRU receives only a signal corresponding to its own operating wavelength. That operating wavelengths match each other mentioned herein refers to that a transmit wavelength of one optical transceiver is the same as a receive wavelength of another optical transceiver such that the other optical transceiver can receive an optical signal sent by the optical transceiver. For example, a transmit wavelength of the optical transceiver 31 is equal to a receive wavelength of the optical transceiver 51, and a receive wavelength of the optical transceiver 31 is equal to a transmit wavelength of the optical transceiver 51. A transmit wavelength of the optical transceiver 32 is equal to a receive wavelength of the optical transceiver 52, and a receive wavelength of the optical transceiver 32 is equal to a transmit wavelength of the optical transceiver 52.

In addition, the foregoing optical transceivers may be dual-core bidirectional optical transceivers, or may be single-core bidirectional optical transceivers. When the optical transceivers are dual-core bidirectional optical transceivers, each optical transceiver has one operating wavelength, which is not only used for transmission, but also used for reception. When the optical transceivers are single-core bidirectional optical transceivers, each optical transceiver has two operating wavelengths, including a transmit wavelength and a receive wavelength. In this implementation manner, by way of example, the optical transceivers are single-core bidirectional optical transceivers, that is, transmission and reception are combined to be performed on one optical fiber, where different wavelengths are used to transmit and receive optical signals.

For example, the transmit wavelength of the optical transceiver 31 is $\lambda 1$, and the receive wavelength of the optical transceiver 31 is $\lambda 2$, where $\lambda 2$ is unequal to $\lambda 1$. The transmit wavelength of the optical transceiver 32 is $\lambda 3$, and the receive wavelength of the optical transceiver 32 is $\lambda 4$, where $\lambda 4$ is unequal to $\lambda 3$. Further, the transmit wavelength $\lambda 1$ of the optical transceiver 31 is different from the transmit wavelength $\lambda 3$ of the optical transceiver 32, and the receive wavelength $\lambda 2$ of the optical transceiver 31 is different from the receive wavelength $\lambda 4$ of the optical transceiver 32 in order to ensure that optical signals sent out by different optical transceivers can be received by different RRUs. In addition, because the foregoing optical transceivers are single-core bidirectional optical transceivers, the transmit wavelength $\lambda 1$ and the receive wavelength $\lambda 2$ of the optical transceiver 31 are different, and the transmit wavelength $\lambda 3$ and the receive wavelength $\lambda 4$ of the optical transceiver 32 are different. Therefore, $\lambda 1$, $\lambda 2$, $\lambda 3$, and $\lambda 4$ are different from each other.

The optical transceiver 51 and the optical transceiver 31 are used in a paired manner, and the optical transceiver 52 and the optical transceiver 32 are used in a paired manner. Therefore, the receive wavelength of the optical transceiver 51 is $\lambda 1$, and the transmit wavelength of the optical transceiver 51 is $\lambda 2$ when the transmit wavelength of the optical transceiver 31 is $\lambda 1$, and the receive wavelength of the optical transceiver 31 is $\lambda 2$. The receive wavelength of the optical transceiver 52 is $\lambda 3$, and the transmit wavelength of the optical transceiver 52 is $\lambda 4$ when the transmit wavelength of the optical transceiver 32 is $\lambda 3$, and the receive wavelength of the optical transceiver 32 is $\lambda 4$, where $\lambda 1$, $\lambda 2$, $\lambda 3$, and $\lambda 4$ are different from each other.

The optical transceivers 51 and 52 are connected, by the optical splitter 60, to an optical fiber 70 that is connected to the optical multiplexer 20. Further, the optical transceivers 51 and 52 may be connected to the optical splitter 60 using an optical fiber, for example, a single-core bidirectional optical fiber. The optical multiplexer 20 may be also connected to the optical splitter 60 using an optical fiber, for example, a single-core bidirectional optical fiber. Compared with using a dual-core bidirectional optical fiber, using the single-core bidirectional optical fiber reduces costs.

Figure 3:
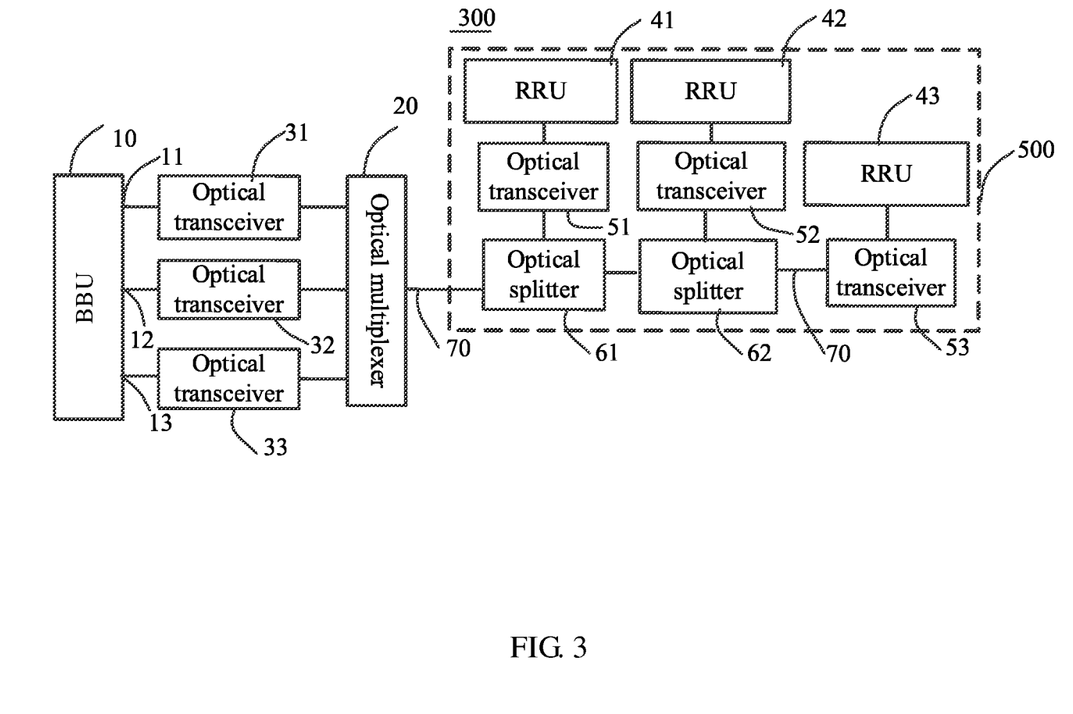
FIG. 3 is a schematic structural diagram of a wireless communications system according to still another embodiment of the present application.
Figure 4:
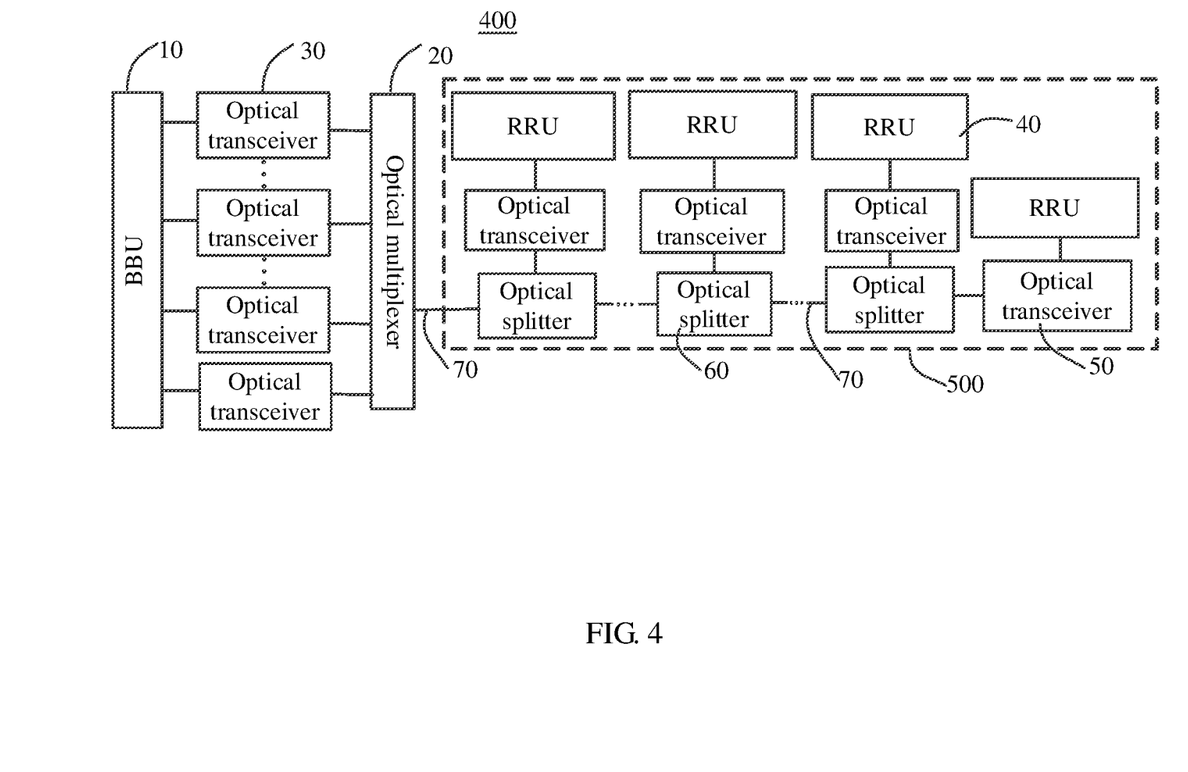
FIG. 4 is a schematic structural diagram of a wireless communications system according to yet another embodiment of the present application.

The optical splitter 60 is also referred to as an optical splitting device, is one of important passive devices on an optical fiber link, and is configured to perform coupling, splitting, and distribution of an optical signal. Quantities of input and output interfaces of the optical splitter 60 may be selected according to a need. As shown in FIG. 1, in this implementation manner, a quantity of RRUs is two, a quantity of optical splitters 60 is one, and a quantity of optical multiplexers 20 is one, and in this case, the optical splitter 60 is a 1:2 optical splitter. Alternatively, as shown in FIG. 3 or FIG. 4, when multiple RRUs are connected in a cascaded manner, that is, each RRU is connected to the optical splitter 60 by one optical transceiver, and the optical splitter 60 is also a 1:2 optical splitter. Because the 1:2 optical splitter has a small volume and can be directly placed in a maintenance cavity of the RRU, costs of mounting are reduced.

In this implementation manner, the quantity of RRUs is two, a quantity of interfaces of BBUs 10 is also two, a quantity of optical transceivers connected to the BBUs 10 is also two, and one optical transceiver is provided between each RRU and the optical splitter. In a specific implementation manner, the BBU 10 and the optical multiplexer 20 may be placed in an equipment room, and the RRUs 41 and 42 may be remotely placed at an outdoor station using an optical fiber. The optical transceiver 31 is mounted on an interface 11, corresponding to the RRU 41, of the BBU 10, and the optical transceiver 32 is mounted on an interface 12, corresponding to the RRU 42, of the BBU 10. The optical transceiver 51 is mounted on the RRU 41, and the optical transceiver 52 is mounted on the RRU 42. The optical splitter 60 may be independently provided, or may be provided in a maintenance cavity of the RRU 41.

In a downlink direction, the BBU 10 modulates and encodes downlink baseband data, and sends modulated and encoded downlink data to the optical transceivers 31 and 32 through the interface 11 and the interface 12. The optical transceivers 31 and 32 convert the received downlink data into optical carrier signals having different wavelengths, and send the optical carrier signals to the optical multiplexer 20, and the optical multiplexer 20 combines the optical carrier signals from the optical transceivers 31 and 32 onto one optical fiber in order to send the optical carrier signals to the optical splitter 60 though the optical fiber 70. The optical transceivers 51 and 52 connected to the optical splitter 60 selectively receive, according to the wavelengths, data corresponding to the wavelengths. The receive wavelength of the optical transceiver 51 is equal to the transmit wavelength of the optical transceiver 31, and the optical transceiver 51 can receive only data sent by the optical transceiver 31 to the optical multiplexer 20. The receive wavelength of the optical transceiver 52 is equal to the transmit wavelength of the optical transceiver 32, and the optical transceiver 52 can receive only data sent by the optical transceiver 32 to the optical multiplexer 20. After converting received signals into downlink electrical signals, the two optical transceivers 51 and 52 send the downlink electrical signals to the RRUs 41 and 42, respectively, and the RRUs 41 and 42 transmit the received signals to an antenna feeder by means of transmission filtering after the received signals undergoes radio frequency filtering and passes a linear power amplifier.

In an uplink direction, the RRUs 41 and 42 perform filtering, low noise amplification, further radio frequency small signal amplification and filtering, down-conversion, analog-to-digital conversion, digital intermediate frequency processing, and the like on an uplink signal received from a mobile terminal to generate uplink electrical signals, and transmit the uplink electrical signals to the optical transceivers 51 and 52, respectively. The optical transceivers 51 and 52 convert the received uplink electrical signals into uplink optical carrier signals. The optical transceivers 51 and 52 have different transmit wavelengths, where a transmit wavelength of the optical transceiver 51 is equal to the receive wavelength of the optical transceiver 31 such that data sent by the optical transceiver 51 can be only received by the optical transceiver 31, and a transmit wavelength of the optical transceiver 52 is equal to the receive wavelength of the optical transceiver 32 such that data sent by the optical transceiver 52 can be only received by the optical transceiver 32. The optical splitter 60 couples the received two links of uplink optical carrier signals onto a same downlink optical fiber 70, and sends the signals to the optical multiplexer 20. The optical multiplexer 20 separates the received optical carrier signals, and separately sends the separated optical carrier signals to the optical transceivers 31 and 32. The optical transceivers 31 and 32 convert the received optical carrier signals into uplink data signals, and send the uplink data signals to corresponding interfaces of the BBU 10, and the BBU 10 demodulates and decodes the received uplink data signals, and transmits demodulated and decoded uplink data signals to a gateway.

It can be seen that when the RRU 41 is faulty, a signal of the RRU 42 can be directly transmitted to the optical splitter 60, and transferred to the BBU 10 using the optical splitter 60, and a signal of the BBU 10 can also be transmitted to the RRU 42 using the optical splitter 60, thereby ensuring that the RRU 42 can work normally.

In the foregoing wireless communications system 100, an optical splitter 60 is provided between two RRUs, that is, a first RRU 41 and a second RRU 42, and even when the first RRU 41 is faulty, a signal of the second RRU 42 can be directly transmitted to the optical splitter 60, and transferred to a BBU 10 using the optical splitter 60, and a signal of the BBU 10 can also be transmitted to the second RRU 42 using the optical splitter 60, thereby ensuring that the RRU 42 can work normally, which resolves a technical problem of low system reliability caused by that when a RRU of multiple cascaded RRUs is faulty in an existing distributed base station architecture, all next RRUs cannot work.

In addition, all links use different wavelengths for communication, and are completely independent of each other, which also resolves a technical problem that when multiple RRUs are cascaded, a rate of an optical transceiver increases and a quantity of cascaded RRUs on a same link is limited because communication bandwidth is superimposed.

Embodiment 2

Figure 2:
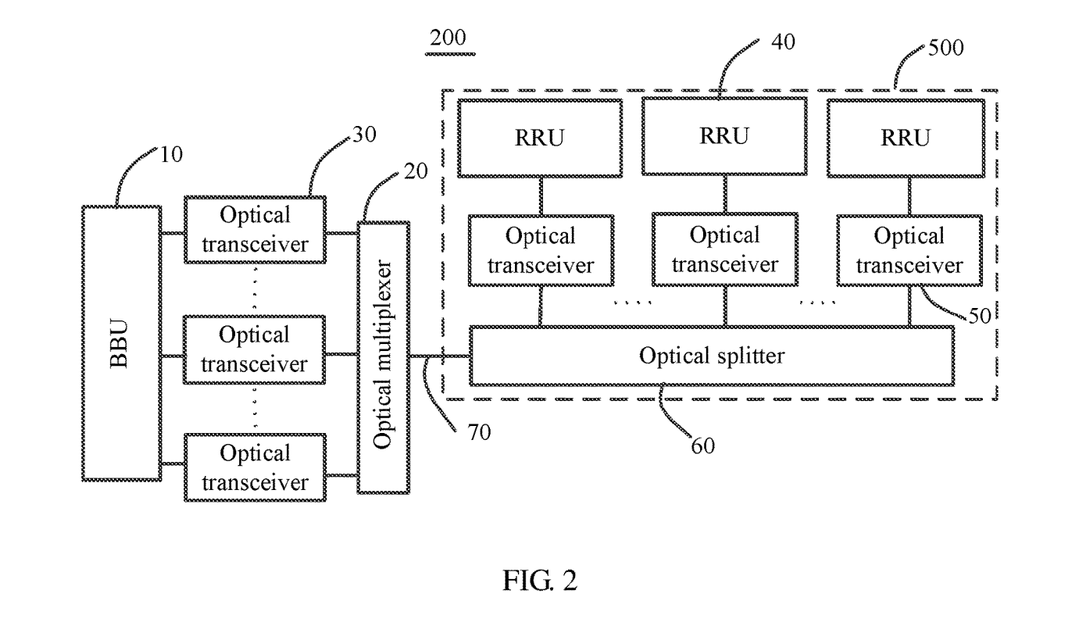
FIG. 2 is a schematic structural diagram of a wireless communications system according to another embodiment of the present application.

Base on a same inventive idea, this application further provides a wireless communications system 200. As shown in FIG. 2, the wireless communications system 200 is different from the wireless communications system 100 in that a quantity of optical transceivers and a quantity of RRUs are different, and an optical splitter is different.

In this implementation manner, a quantity of RRUs 40 is M, correspondingly, M optical transceivers 50 are separately connected to the M RRUs 40, and M optical transceivers 30 are provided on M interfaces between a BBU 10 and the M RRUs 40. An optical splitter 60 may be a 1:N optical splitter, where M is an integer greater than or equal to 3, and N is an integer greater than or equal to 2. The M RRUs 40 are separately connected to the optical splitter 60 by the M optical transceivers 50.

In this implementation manner, N is equal to M, the optical splitter 60 is a 1:M optical splitter and has M+1 interfaces, where a quantity of optical splitters is one. In this case, all the RRUs 40 are connected the optical splitter 60.

In another implementation manner, N may be unequal to M, for example, when N is equal to 2, the optical splitter 60 is a 1:2 optical splitter and has three interfaces, where a quantity of optical splitters is M−1. One interface of a first optical splitter is connected to an optical multiplexer 20 by an optical fiber, such as an optical fiber 70 in order to receive multiple links of optical signals that are obtained by the optical multiplexer 20 by means of combining, and the other two interfaces are separately connected to the first RRU 40 and the second optical splitter. One interface of the ith optical splitter is connected to the (i−1)th optical splitter, and the other two interfaces are separately connected to the ith RRU and the (i+1)th optical splitter, where 2≤i≤M−2. One interface of the last optical splitter, that is, the (M−1)th optical splitter, is connected to the (M−2)th optical splitter, and the other two interfaces are separately connected to the (M−1)th RRU and the Mth RRU.

The operating principle of the foregoing wireless communications system 200 is the same as that of the wireless communications system 100, and the details are not described herein again. When any RRU 40 of the M RRUs 40 is faulty, signals of the other RRUs 40 can be directly transmitted to the optical splitter 60, and transferred to the BBU 10 using the optical splitter 60, and a signal of the BBU 10 can also be transmitted to the other RRUs 40 using the optical splitter 60, thereby ensuring that the other RRUs 40 can work normally, which resolves a technical problem of low system reliability caused by that when an RRU of multiple cascaded RRUs is faulty in an existing distributed base station architecture, all next RRUs cannot work.

In addition, all links use different wavelengths for communication, and are completely independent of each other, which also resolves a technical problem that when multiple RRUs are cascaded, a rate of an optical transceiver increases and a quantity of cascaded RRUs on a same link is limited because communication bandwidth is superimposed.

Embodiment 3

Base on a same inventive idea, this application further provides a wireless communications system 300. As shown in FIG. 3, FIG. 3 is a schematic structural diagram of a wireless communications system 300 according to another embodiment of the present application. The wireless communications system 300 is different from the wireless communications system 100 in FIG. 1 in that a quantity of optical splitters is two (designated as optical splitters 61 and 62), and a quantity of RRUs is three (designated as RRUs 41, 42, and 43), and correspondingly, a quantity of interfaces of a BBU 10 is also three, a quantity of optical transceivers connected to the BBU 10 is three (designated as optical transceivers 31, 32, and 33), and a quantity of optical transceivers connected to the RRUs 40 is also three (designated as optical transceivers 51, 52, and 53).

The quantity of optical splitters 61 and 62 is one less than the quantity of RRUs 41, 42, and 43, that is, there are two optical splitters 61 and 62. The optical splitter 61 is connected to an optical multiplexer 20 and the optical splitter 62, an RRU 41 is connected to the optical splitter 61 by an optical transceiver 51, an RRU 42 is connected to the optical splitter 62 by an optical transceiver 52, and an RRU 43 is connected to the optical splitter 62 by an optical transceiver 53.

In a specific implementation manner, the BBU 10 and the optical multiplexer 20 are placed in an equipment room, and the three RRUs 31, 32, and 33 may be remotely placed at an outdoor station using an optical fiber. An optical transceiver 31 is mounted on an interface 11, corresponding to the first RRU 41, of the BBU 10. An optical transceiver 32 is mounted on an interface 12, corresponding to the second RRU 42, of the BBU 10. An optical transceiver 33 is mounted on an interface 13, corresponding to the third RRU 43, of the BBU 10. The optical transceiver 51 is mounted on the RRU 41, the optical transceiver 52 is mounted on the RRU 42, and the optical transceiver 53 is mounted on the RRU 43. The optical splitter 61 is placed in a maintenance cavity of the RRU 41, and the optical splitter 62 is placed in a maintenance cavity of the RRU 42.

In a downlink direction, the BBU 10 modulates and encodes downlink baseband data, and sends modulated and encoded downlink data to the optical transceivers 31, 32 and 33 through the interface 11, the interface 12, and the interface 13. The optical transceivers 31, 32 and 33 convert the received downlink data into optical carrier signals having different wavelengths, and send the optical carrier signals to the optical multiplexer 20, and the optical multiplexer 20 combines the received optical carrier signals onto one optical fiber 70, and sends the optical carrier signals to the three optical transceivers 51, 52, and 53 through the optical splitters 61 and 62, and the three optical transceivers 51, 52, and 53 selectively receive, according to the wavelengths, data corresponding to the wavelengths. A receive wavelength of the optical transceiver 51 is equal to a transmit wavelength of the optical transceiver 31, and the optical transceiver 51 can receive only data sent by the optical transceiver 31. A receive wavelength of the optical transceiver 52 is equal to a transmit wavelength of the optical transceiver 32, and the optical transceiver 52 can receive only data sent by the optical transceiver 32. A receive wavelength of the optical transceiver 53 is equal to a transmit wavelength of the optical transceiver 33, and the optical transceiver 53 can receive only data sent by the optical transceiver 33. After converting the received signals into downlink electrical signals, the three optical transceivers 51, 52, and 53 send the downlink electrical signals to the three RRUs 41, 42, and 43, and the three RRUs 41, 42, and 43 sends the received signals to an antenna feeder by means of transmission filtering after the signals undergoes radio frequency filtering and passes a linear power amplifier.

In an uplink direction, the three RRUs 41, 42, and 43 perform radio frequency filtering, low noise amplification, further radio frequency small signal amplification and filtering, down-conversion, analog-to-digital conversion, digital intermediate frequency processing, and the like on an uplink signal received from a mobile terminal to generate uplink electrical signals, and transmit the uplink electrical signals to the three optical transceivers 51, 52, and 53, and the three optical transceivers 51, 52, and 53 convert the received uplink electrical signals into uplink optical carrier signals. The three optical transceivers 51, 52, and 53 have different transmit wavelengths, where a transmit wavelength of the optical transceiver 51 is equal to a receive wavelength of the optical transceiver 31, and data sent by the optical transceiver 51 can be only received by the optical transceiver 31. A transmit wavelength of the optical transceiver 52 is equal to a receive wavelength of the optical transceiver 32, and data sent by the optical transceiver 52 can be only received by the optical transceiver 32, and a transmit wavelength of the optical transceiver 53 is equal to a receive wavelength of the optical transceiver 33, and data sent by the optical transceiver 53 can be only received by the optical transceiver 33. The optical splitters 61 and 62 couple the three links of uplink optical carrier signals onto a same downlink optical fiber 70, and send the signals to the optical multiplexer 20. The optical multiplexer 20 separates the received optical carrier signals, and separately sends the separated optical carrier signals to the optical transceivers 31 32, and 33. After separately converting the received optical carrier signals into uplink data signals, the optical transceivers 31, 32, and 33 send the uplink data signals to the corresponding three interfaces 11, 12, and 13 of the BBU 10, respectively, and the BBU 10 demodulates and decodes the received uplink data signals, and transmits demodulated and decoded uplink data signals to a gateway.

It can be seen that in the foregoing embodiment, optical signals of different RRUs are transmitted using different wavelengths, and correspondingly, optical transceivers of the cascaded RRUs work at different wavelengths. Optical splitters are further provided, and the optical transceivers of these cascaded RRUs are all connected to the optical splitters, and are connected to a same optical fiber by the optical splitters. In this way, the optical signals of the multiple RRUs that are transmitted on the optical fiber can be transmitted to the optical transceivers of all the RRUs using the optical splitters, and each optical transceiver receives only a signal corresponding to its own operating wavelength. Therefore, each RRU can correctly receive its own signal, and when an RRU is faulty, operation of the other RRUs is not affected. For example, when the RRU 41 is faulty, signals of the RRUs 42 and 43 can be directly transferred to the BBU 10 using the optical splitters 61 and 62, and a signal of the BBU 10 can also be transmitted to the RRU 42 and the RRU 43 using the optical splitters 61 and 62, thereby ensuring that the RRUs 42 and 43 can work normally. When both the RRU 41 and the RRU 42 are faulty, the RRU 43 can transfer a signal to the BBU 10 using the optical splitters 62 and 61, and a signal of the BBU 10 can also be transferred to the RRU 43 using the optical splitters 61 and 62, which resolves a technical problem of low system reliability caused by that when an RRU of multiple cascaded RRUs is faulty in an existing distributed base station architecture, all next RRUs cannot work.

In addition, all links use different wavelengths for communication, and are completely independent of each other, which also resolves a technical problem that when multiple RRUs are cascaded, a rate of an optical transceiver increases and a quantity of cascaded RRUs on a same link is limited because communication bandwidth is superimposed.

Embodiment 4

Base on a same inventive idea, this application further provides a wireless communications system 400. As shown in FIG. 4, FIG. 4 is a schematic structural diagram of a wireless communications system 400 according to still another embodiment of the present application. The wireless communications system 400 is different from the wireless communications system 100 in FIG. 2 in that a quantity of RRUs 40, a quantity of optical splitters 60, and a quantity of optical transceivers 50 are different. In this implementation manner, the quantity of RRUs 40 is M, where M is greater than 3. Correspondingly, M optical transceivers 50 are separately connected to the M RRUs, and M optical transceivers 30 are provided on M interfaces between a BBU 10 and the M RRUs 40. The optical splitter 60 is a 1:2 optical splitter, and the quantity of optical splitters 60 is M−1, where the M−1 optical splitters 60 are cascaded using a single-core optical fiber 70.

One interface of the first optical splitter 60 is connected to an optical multiplexer 20 by the optical fiber 70 in order to receive multiple links of optical signals that are obtained by the optical multiplexer 20 by means of combining, and the other two interfaces are separately connected to the first RRU 40 and the second optical splitter 60. One interface of the ith optical splitter 60 is connected to the (i−1)th optical splitter 60, and the other two interfaces are separately connected to the ith RRU 40 and the (i+1)th optical splitter 60, where 2≤i≤M−2. One interface of the last optical splitter 60, that is, the (M−1)th optical splitter 60, is connected to the (M−2)th optical splitter 60, and the other two interfaces are separately connected to the (M−1)th RRU 40 and the Mth RRU 40.

In a specific implementation manner, the BBU 10 and the optical multiplexer 20 may be placed in an equipment room, and the M RRUs 40 may be remotely placed at an outdoor station using an optical fiber 70. The first optical transceiver 30 is mounted on an interface 1, corresponding to the first RRU 40, of the BBU 10. The jth optical transceiver 30 is mounted on an interface j, corresponding to the jth RRU, of the BBU 10, where 1<j<M. The Mth optical transceiver 30 is mounted on an interface M, corresponding to the Mth RRU 40, of the BBU 10. The first optical transceiver 50 is mounted on the first RRU 40, the jth optical transceiver is mounted on the jth RRU 40, where 1<j<M, and the Mth optical transceiver 50 is mounted on the Mth RRU 40. In addition, the first optical splitter 60 may be placed in a maintenance cavity of the first RRU 40, the ith optical splitter 60 may be placed in a maintenance cavity of the ith RRU 40, where 2≤i≤M−2, and the (M−1)th optical splitter 60 may be placed in a maintenance cavity of the (M−1)th RRU 40. However, this embodiment is not limited thereto, and the optical splitters 60 may be placed independently, or placed in another manner.

In a downlink direction, the BBU 10 modulates and encodes downlink baseband data, and sends modulated and encoded downlink data to the M optical transceivers 30. The M optical transceivers 30 convert the received downlink data into optical carrier signals having different wavelengths, and send the optical carrier signals to the optical multiplexer 20. The optical multiplexer 20 combines the received optical carrier signals onto one optical fiber, and sends the optical carrier signals to the M optical transceivers 50 through the optical splitters 60, and the M optical transceivers 50 selectively receive, according to the wavelengths, data sent to the M optical transceivers 50. After separately converting the received signals into downlink electrical signals, the M optical transceivers 50 send the downlink electrical signals to the M RRUs 40, and the M RRUs 40 separately transmit the received signals to an antenna feeder by means of transmission filtering after the received signals undergoes radio frequency filtering and passes a linear power amplifier.

In an uplink direction, the M RRUs 40 perform filtering, low noise amplification, further radio frequency small signal amplification and filtering, down-conversion, analog-to-digital conversion, digital intermediate frequency processing, and the like on an uplink signal received from a mobile terminal to generate uplink electrical signals, and transmit the uplink electrical signals to the M optical transceivers 50 correspondingly, and the M optical transceivers 50 separately convert the received uplink electrical signals into uplink optical carrier signals and send the uplink optical carrier signals to the optical splitters 60.

The M optical transceivers 50 have different transmit wavelengths. Each optical transceiver 50 has one optical transceiver 30 matching the optical transceiver 50, that is, a transmit wavelength of each optical transceiver 50 is equal to a receive wavelength of one optical transceiver 30, and data sent by the optical transceiver 50 can only be received by the optical transceiver. The optical splitters 60 couple M links of uplink optical carrier signals onto a same downlink optical fiber, and send the signals to the optical multiplexer 20. The optical multiplexer 20 separates the received optical carrier signals, and sends the separated optical carrier signals separately to the M optical transceivers 30. The M optical transceivers 30 convert the received optical carrier signals into uplink data signals, and send the uplink data signals to the BBU 10, and the BBU 10 demodulates and decodes the received uplink data signals, and transmits demodulated and decoded uplink data signals to a gateway.

It can be seen that in the foregoing embodiment, optical signals of different RRUs are transmitted using different wavelengths, and correspondingly, optical transceivers of the cascaded RRUs work at different wavelengths. Optical splitters are further provided, and the optical transceivers of these cascaded RRUs are all connected to the optical splitters, and are connected to a same optical fiber by the optical splitters. In this way, the optical signals of the multiple RRUs that are transmitted on the optical fiber can be transmitted to the optical transceivers of all the RRUs using the optical splitters, and each optical transceiver receives only a signal corresponding to its own operating wavelength. Therefore, each RRU can correctly receive its own signal, and when an RRU is faulty, operation of the other RRUs is not affected. For example, when the first RRU is faulty, signals of the other RRUs can be directly transferred to the BBU using the optical splitters, and a signal of the BBU can also be transmitted to the other RRUs using the optical splitters, thereby ensuring that the other RRUs can work normally, which resolves a technical problem of low system reliability caused by that when an RRU of multiple cascaded RRUs is faulty in an existing distributed base station architecture, all next RRUs cannot work.

In addition, all links use different wavelengths for communication, and are completely independent of each other, which also resolves a technical problem that when multiple RRUs are cascaded, a rate of an optical transceiver increases and a quantity of cascaded RRUs on a same link is limited because communication bandwidth is superimposed.

Embodiment 5

Based on a same inventive idea, this application further provides a wireless radio frequency apparatus, where the wireless radio frequency apparatus includes M RRUs, where M is an integer greater than or equal to 2, M optical transceivers, separately connected to the M RRUs, where operating wavelengths of the M optical transceivers are different from each other, and at least one optical splitter, where the at least one optical splitter connects the M optical transceivers to a same optical fiber, that is, the M optical transceivers are connected to a same optical fiber by the at least one optical splitter.

Preferably, the optical splitter is a 1:N optical splitter, where N is an integer greater than or equal to 2 and less than or equal to M.

Preferably, the optical splitter is a 1:2 optical splitter, and a quantity of optical splitters is M−1.

Preferably, when M is greater than 2, the M−1 optical splitters are connected to each other by a single-core optical fiber.

Preferably, the optical fiber is a single-core optical fiber.

Preferably, an operating wavelength of each optical transceiver of the first optical transceivers and the second optical transceivers includes a receive wavelength and a transmit wavelength.

It can be seen that in the embodiment, optical signals of different RRUs are transmitted using different wavelengths (which includes transmission from an RRU to a BBU, and transmission from a BBU to an RRU), and correspondingly, optical transceivers of the cascaded RRUs work at different wavelengths. Further, an optical splitter is further provided, and the optical transceivers of these cascaded RRUs are all connected to the optical splitter, and are connected to a same optical fiber by the optical splitter. In this way, optical signals of multiple RRUs that are transmitted on the optical fiber can be transmitted to the optical transceivers of all the RRUs using the optical splitter, and each optical transceiver receives only a signal corresponding to its own operating wavelength. Therefore, each RRU can correctly receive its own signal, and when an RRU is faulty, operation of the other RRUs is not affected, which greatly increases system reliability.

In addition, in some approaches, data of all RRUs needs to pass through a CPRI of the first RRU, and therefore, there is a relatively high requirement on bandwidth of the CPRI, which increases costs, and in a case in which the bandwidth of the CPRI is limited, a quantity of levels of cascaded RRUs is limited. In addition, an increase in the bandwidth of the CPRI increases a requirement on a rate of an optical transceiver, which further increases the costs.

However, after the foregoing solution is used, each RRU receives its own signal without the need to forward a signal of another RRU, which reduces the requirement on the bandwidth of the CPRI and reduces the costs, and does not cause any limitation to the quantity of levels of cascaded RRUs. Further, each RRU no longer needs to be provided with two CPRIs, thereby further reducing the costs. In addition, a decrease in the requirement on the bandwidth of the CPRI further reduces the requirement on the rate of the optical transceiver, which further reduces the costs.

Although some preferred embodiments of the present application have been described, persons skilled in the art can make changes and modifications to these embodiments once they learn the basic inventive concept. Therefore, the following claims are intended to be construed as to cover the preferred embodiments and all changes and modifications falling within the scope of the present application.

Obviously, persons skilled in the art can make various modifications and variations to the present application without departing from the spirit and scope of the present application. The present application is intended to cover these modifications and variations provided that they fall within the scope of protection defined by the following claims and their equivalent technologies.

What is claimed is:

1. An apparatus comprising:
M first optical transceivers, wherein operating wavelengths of the M first optical transceivers are different from each other, and wherein M is an integer greater than or equal to 2;
at least one optical splitter coupling the M first optical transceivers to a single optical fiber, wherein each of the at least one optical splitter is a passive device on an optical fiber link;
an optical multiplexer coupled to the at least one optical splitter through an optical fiber; and
M second optical transceivers corresponding to the M first optical transceivers and coupled to the optical multiplexer, wherein operating wavelengths of the M second optical transceivers are different from each other, and wherein an operating wavelength of a first optical transceiver matches an operating wavelength of a second optical transceiver corresponding to the first optical transceiver,
wherein the M first optical transceivers and the M second optical transceivers are single-core bidirectional optical transceivers, wherein the operating wavelength of each of the first and second optical transceivers comprises a transmit wavelength and a receive wavelength, and wherein the transmit wavelength and the receive wavelength are different and are respectively used to transmit and receive optical signals.

2. The apparatus of claim 1, wherein the at least one optical splitter comprises a 1:N optical splitter, and wherein N is an integer greater than or equal to 2 and less than or equal to M.

3. The apparatus of claim 2, wherein each of the at least one optical splitter is a 1:2 optical splitter, and wherein a quantity of the at least one optical splitter is M−1.

4. The apparatus of claim 3, wherein each of the at least one optical splitter has three interfaces comprising one of:
one interface of a first optical splitter configured to receive multiple links of optical signals, wherein the other two interfaces are separately coupled to a first optical transceiver of the M first optical transceivers and a second optical splitter;
one interface of an ith optical splitter coupled to an (i−1)th optical splitter, wherein the other two interfaces are separately coupled to an ith optical transceiver of the M first optical transceivers and an (i+1)th optical splitter, wherein $2 \leq i \leq M-2$; or
one interface of an (M−1)th optical splitter coupled to an (M−2)th optical splitter, wherein the other two interfaces are separately coupled to an (M−1)th optical transceiver and an Mth optical transceiver of the M first optical transceivers.

5. The apparatus of claim 3, wherein M is greater than 2, and wherein the M−1 optical splitters are coupled to each other by a single-core optical fiber.

6. The apparatus of claim 1, wherein for the first optical transceiver and the second optical transceiver, the transmit wavelength of the first optical transceiver is the same as the receive wavelength of the second optical transceiver.

7. The apparatus of claim 6, wherein the receive wavelength of the first optical transceiver is the same as the transmit wavelength of the second optical transceiver.

8. The apparatus of claim 1, wherein the single optical fiber is a single-core optical fiber.

9. A wireless radio frequency device comprising:
an apparatus comprising:
M first optical transceivers, wherein operating wavelengths of the M first optical transceivers are different from each other, and wherein M is an integer greater than or equal to 2;
at least one optical splitter coupling the M first optical transceivers to a single optical fiber, wherein each of the at least one optical splitter is a passive device on an optical fiber link;
an optical multiplexer coupled to the at least one optical splitter through an optical fiber; and
M second optical transceivers corresponding to the M first optical transceivers and coupled to the optical multiplexer, wherein operating wavelengths of the M second optical transceivers are different from each other, and wherein an operating wavelength of a first optical transceiver matches an operating wavelength of a second optical transceiver corresponding to the first optical transceiver,
wherein the M first optical transceivers and the M second optical transceivers are single-core bidirectional optical transceivers, wherein the operating wavelength of each of the first and second optical transceivers comprises a transmit wavelength and a receive wavelength, and wherein the transmit wavelength and the receive wavelength are different and are respectively used to transmit and receive optical signals; and
M remote radio units separately coupled to the M first optical transceivers.

10. The wireless radio frequency device of claim 9, wherein the at least one optical splitter is placed in a maintenance cavity of a corresponding remote radio unit.

11. The wireless radio frequency device of claim 9, wherein for the first optical transceiver and the second optical transceiver, the transmit wavelength of the first optical transceiver is the same as the receive wavelength of the second optical transceiver.

12. The wireless radio frequency device of claim 11, wherein the receive wavelength of the first optical transceiver is the same as the transmit wavelength of the second optical transceiver.

13. A wireless communications system comprising:
an apparatus comprising:
M first optical transceivers, wherein operating wavelengths of the M first optical transceivers are different from each other, and wherein M is an integer greater than or equal to 2;
at least one optical splitter coupling the M first optical transceivers to a single optical fiber, wherein each of the at least one optical splitter is a passive device on an optical fiber link;
an optical multiplexer coupled to the at least one optical splitter through an optical fiber; and
M second optical transceivers corresponding to the M first optical transceivers and coupled to the optical multiplexer, wherein operating wavelengths of the M second optical transceivers are different from each other, and for a corresponding first optical transceiver and a second optical transceiver, an operating wavelength of the first optical transceiver matches an operating wavelength of the second optical transceiver;
wherein the M first optical transceivers and the M second optical transceivers are single-core bidirectional optical transceivers, wherein the operating wavelength of each of the first and second optical transceivers comprises a transmit wavelength and a receive wavelength, and wherein the transmit wavelength and the receive wavelength are different and are respectively used to transmit and receive optical signals;
M remote radio units separately coupled to the M first optical transceivers in the apparatus; and
a baseband processing unit coupled to the M second optical transceivers.

14. The wireless communications system of claim 13, wherein the at least one optical splitter is placed in a maintenance cavity of a corresponding remote radio unit.

15. The wireless communications system of claim 13, wherein for the first optical transceiver and the second optical transceiver, a transmit wavelength of the first optical transceiver is the same as a receive wavelength of the second optical transceiver.

16. The wireless communications system of claim 15, wherein a receive wavelength of the first optical transceiver is the same as a transmit wavelength of the second optical transceiver.

17. The wireless communications system of claim 13, wherein the at least one optical splitter is a 1:N optical splitter.

18. The wireless communications system of claim 17, wherein N is an integer greater than or equal to 2 and less than or equal to M.

19. The wireless communications system of claim 13, wherein the at least one optical splitter is a 1:2 optical splitter.

20. The wireless communications system of claim 19, wherein a quantity of the at least one optical splitter is M−1.

* * * * *

UNITED STATES PATENT AND TRADEMARK OFFICE
CERTIFICATE OF CORRECTION

PATENT NO. : 10,826,610 B2
APPLICATION NO. : 16/357739
DATED : November 3, 2020
INVENTOR(S) : Liexun Feng It is certified that error appears in the above-identified patent and that said Letters Patent is hereby corrected as shown below:

On the Title Page

On Page 2, Column 1 Item (56), References Cited, Foreign Patent Documents: "CN 22374404 U 8/2012" should read "CN 202374404 U 8/2012"

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*